(12) United States Patent
Fujiwara

(10) Patent No.: US 12,192,628 B2
(45) Date of Patent: Jan. 7, 2025

(54) ELECTRONIC DEVICE, CONTROL METHOD, AND STORAGE MEDIUM

(71) Applicant: CANON KABUSHIKI KAISHA, Tokyo (JP)

(72) Inventor: Sei Fujiwara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 17/692,811

(22) Filed: Mar. 11, 2022

(65) Prior Publication Data

US 2022/0303469 A1   Sep. 22, 2022

(30) Foreign Application Priority Data

Mar. 17, 2021 (JP) ................. 2021-043283

(51) Int. Cl.
  *H04N 23/68*      (2023.01)
  *G06N 20/00*      (2019.01)

(52) U.S. Cl.
  CPC ........... *H04N 23/687* (2023.01); *G06N 20/00* (2019.01); *H04N 23/6812* (2023.01); *G06F 2218/02* (2023.01)

(58) Field of Classification Search
  CPC ............. H04N 23/687; H04N 23/6812; H04N 23/617; G06N 20/00; G06F 2218/02
  USPC ...................................................... 348/208.2
  See application file for complete search history.

(56) References Cited

U.S. PATENT DOCUMENTS

2014/0186017 A1*  7/2014  Shibata ................ G02B 27/646
                                                               396/55
2021/0384353 A1* 12/2021  Endo .................... H01L 27/0733

FOREIGN PATENT DOCUMENTS

| CN | 111953891 A | 11/2020 |
|----|-------------|---------|
| JP | H0667272 A  | 3/1994  |
| JP | 2004158902 A | 6/2004 |
| JP | 2008141675 A | 6/2008 |
| JP | 2010074378 A | 4/2010 |
| JP | 5743838 B2  | 7/2015  |
| JP | 2018017748 A | 2/2018 |
| WO | 2019038664 A1 | 2/2019 |
| WO | 2020017463 A1 | 1/2020 |

OTHER PUBLICATIONS

Wu Yanqing; Application of Shake Compensation Techniques in Underwater Camera System; cnki.net; Process Automation Instrumentation; vol. 34 No. 12 Dec. 20, 2013; pp. 17-20.

* cited by examiner

*Primary Examiner* — Joel W Fosselman
(74) *Attorney, Agent, or Firm* — Canon U.S.A., Inc. IP Division

(57) ABSTRACT

Ac device includes an acquisition unit configured to acquire first information regarding shake, a calculation unit configured to input the first information to a machine learning model and output second information regarding a type of the shake, and a first control unit configured to control an image stabilization using the second information. By using the second information output from the calculation unit based on the first information before a capturing instruction is given, the first control unit controls an image stabilization after the capturing instruction is given.

19 Claims, 17 Drawing Sheets

FIG.5

| TYPE OF SHAKE | WALKING STATE | TRIPOD STATE | PANNING STATE | HOLD STATE | ANOTHER STATE |
|---|---|---|---|---|---|
| ACCURACY RATE | 100% | 49% | 88% | 99% | 100% |

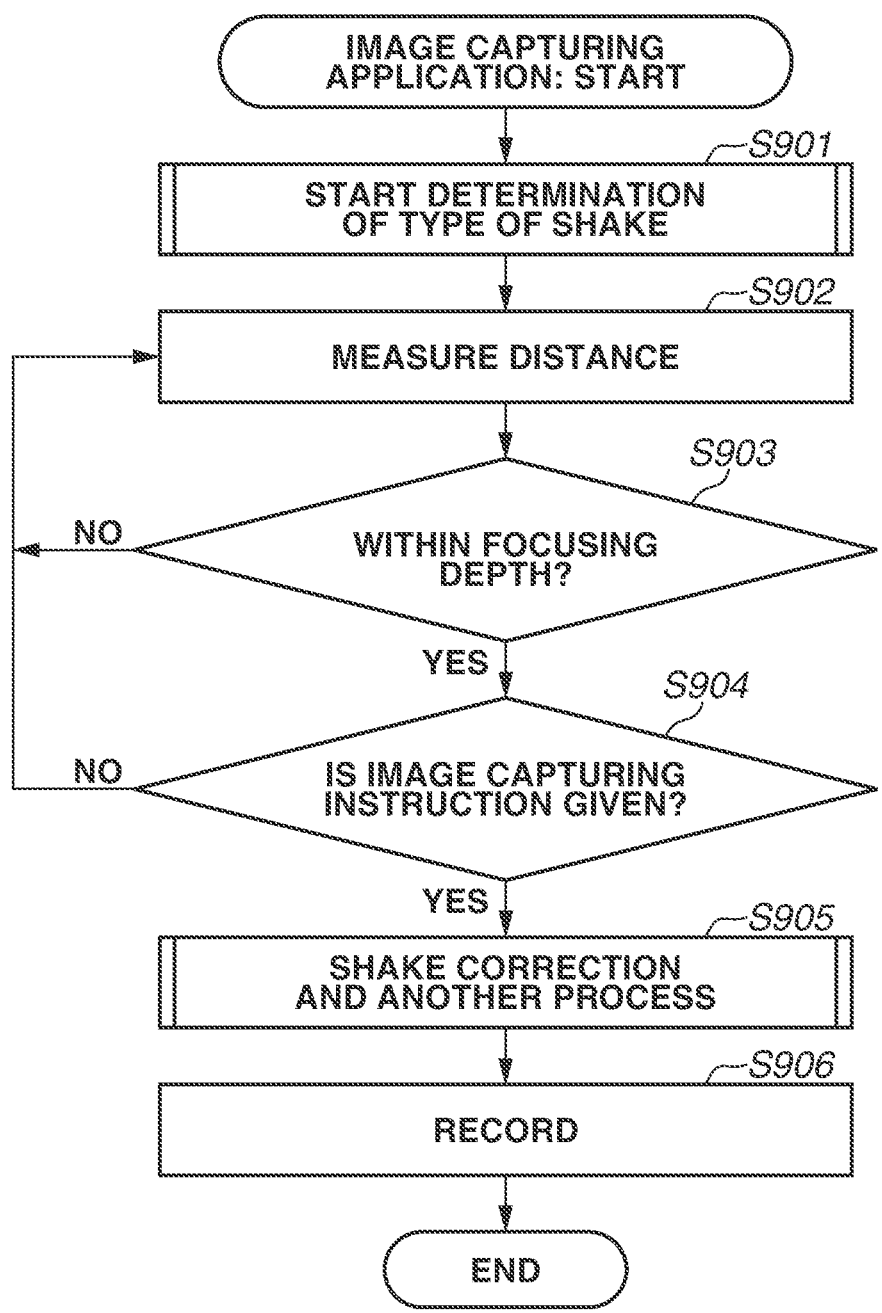

ELECTRONIC DEVICE, CONTROL METHOD, AND STORAGE MEDIUM

BACKGROUND

Field of the Disclosure

The aspect of the embodiments relates to an electronic device used in an imaging system having an image stabilizing function, and a control method for controlling the same.

Description of the Related Art

There is a case where an electronic device having an image capturing function, such as a camera or a smartphone, includes an image stabilizing function for reducing blur of an image due to camera shake. As control is known regarding the image stabilizing function, a technique for determining an image capturing state based on an angular velocity signal or an acceleration signal and calculating an image stabilizing signal for making an image stabilization according to the result of the determination.

Japanese Patent No. 5743838 discusses an image stabilizing device that distinguishes a static image capturing state and a walking image capturing state based on the time elapsed since an angular velocity signal has exceeded a threshold.

However, there is room for further improvement in the accuracy of the determination of an image capturing state in the image stabilizing device discussed in Japanese Patent No. 5743838.

SUMMARY OF THE DISCLOSURE

According to an aspect of the embodiments, a device includes an acquisition unit configured to acquire first information regarding shake, a calculation unit configured to input the first information to a machine learning model and output second information regarding a type of the shake, and a first control unit configured to control a image stabilization using the second information. By using the second information output from the calculation unit based on the first information before a capturing instruction is given, the first image stabilizing control unit controls an image stabilization after the capturing instruction is given.

According to another aspect of the embodiments, a device used in a system includes a first device and a second device having a control unit configured to communicate with the first device and configured to, using information regarding a type of shake before a capturing instruction is given, control an image stabilization after the capturing instruction is given. The device includes an acquisition unit configured to acquire first information regarding shake that occurs in at least one of the first device and the second device, a calculation unit configured to input the first information to a machine learning model and output information regarding the type of the shake, and a communication unit configured to transmit to the second device the information regarding the type of the shake output from the calculation unit using the first information before the capturing instruction is given.

According to still another aspect of the embodiments, a method includes acquiring first information regarding shake, inputting the first information to a machine learning model and outputting second information regarding a type of the shake, and controlling an image stabilization using the second information. In the controlling, by using the second information output based on the first information before a capturing instruction is given, an image stabilization after the capturing instruction is given is controlled.

Further features of the disclosure will become apparent from the following description of exemplary embodiments with reference to the attached drawings.

BRIEF DESCRIPTION OF THE DRAWINGS

FIG. 5 is a diagram illustrating accuracy of a determination of a type of shake.

FIG. 17 is a flowchart illustrating an image capturing operation according to a sixth exemplary embodiment.

DESCRIPTION OF THE EMBODIMENTS

Exemplary embodiments of the disclosure will be described in detail below with reference to the drawings.

Figure 1:
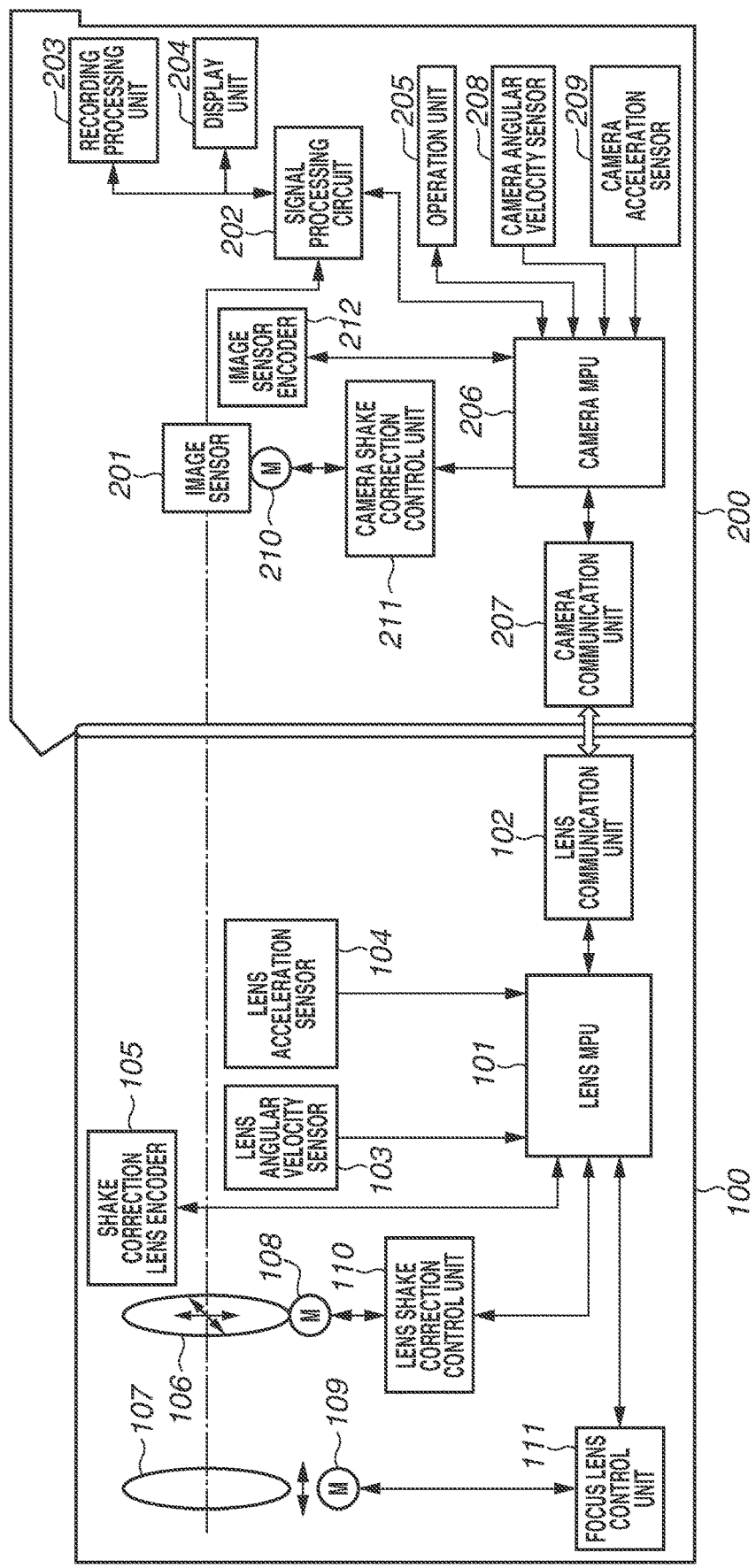
FIG. 1 is a block diagram illustrating an imaging system.

FIG. 1 is a block diagram illustrating an imaging system including an imaging apparatus 200 and a lens apparatus 100 capable of communicating with the imaging apparatus 200. In a first exemplary embodiment, the imaging apparatus 200 has functions of an electronic device according to the disclosure.

The imaging apparatus 200 includes an image sensor 201, a signal processing circuit 202, a recording processing unit 203, a display unit 204, an operation unit 205, a camera micro processing unit (MPU) 206, and a camera communication unit 207. The imaging apparatus 200 also includes a camera angular velocity sensor 208, a camera acceleration sensor 209, an image sensor driving motor 210, a camera image stabilizing control unit 211, and an image sensor encoder 212.

The image sensor 201 photoelectrically converts an object image (an optical image) formed by an imaging optical system in the lens apparatus 100 into an electric signal (an analog signal) and outputs the analog signal. The image sensor 201 is composed of, for example, a complementary metal-oxide-semiconductor (CMOS) sensor or a charge-coupled device (CCD) sensor. The analog signal output from the image sensor 201 is converted into a digital signal by an analog-to-digital (A/D) conversion circuit (not illustrated).

The signal processing circuit 202 performs various types of image processing on the digital signal from the A/D conversion circuit (not illustrated), thereby generating a video signal. The signal processing circuit 202 also generates focus information indicating a focusing state of the imaging optical system and luminance information indicating an exposure state of the imaging optical system. The signal processing circuit 202 also outputs the video signal to the display unit 204, and the display unit 204 displays the video signal as a live view image used to confirm a composition or a focus state. The signal processing circuit 202 also outputs the video signal to the recording processing unit 203. The recording processing unit 203 stores the video signal as image data in an external memory.

The operation unit 205 is composed of, for example, a mode dial for setting various image capturing modes, and a shutter release button for performing an image capturing preparation operation and giving an instruction to start the capturing of an image. If a first shutter release signal (Sw1) generated by a photographer half-pressing the shutter release button is input to the camera MPU 206, the lens apparatus 100 performs an image capturing preparation operation such as autofocus. If the shutter release button is full-pressed by the photographer, a second shutter release signal (Sw2) is generated. The generation and the recording of a still image (an image signal) are performed by inputting the second shutter release signal Sw2 to the camera MPU 206. That is, a full press of the shutter release button corresponds to the giving of an image capturing instruction.

The camera MPU 206 controls the imaging apparatus 200. The camera MPU 206 also communicates with the lens apparatus 100 via the camera communication unit 207 and exchanges data with the lens apparatus 100.

Although the camera MPU 206 is an MPU in the present exemplary embodiment, circuits or various processors such as a central processing unit (CPU) may be used.

The camera angular velocity sensor 208 outputs an angular velocity signal regarding the angular velocity of the imaging apparatus 200. The camera acceleration sensor 209 outputs an acceleration signal regarding the acceleration of the imaging apparatus 200. The angular velocity signal output from the camera angular velocity sensor 208 and the acceleration signal output from the camera acceleration sensor 209 are input as camera shake detection signals to the camera MPU 206.

The camera MPU 206 uses the camera shake detection signals to calculate a driving target signal for driving the image sensor 201. An image stabilizing signal based on the difference between the driving target signal and a position signal of the image sensor 201 output from the image sensor encoder 212 is output to the camera image stabilizing control unit 211. The camera image stabilizing control unit 211 drives the image sensor driving motor 210 based on the image stabilizing signal, thereby moving the image sensor 201 in a direction orthogonal to the optical axis of the imaging optical system in the lens apparatus 100. This movement of the image sensor 201 reduces the blur of an image caused by the shake of the imaging system.

The imaging apparatus 200 may include only either one of the camera angular velocity sensor 208 and the camera acceleration sensor 209. In a case where the imaging apparatus 200 includes both the camera angular velocity sensor 208 and the camera acceleration sensor 209, however, the imaging apparatus 200 can obtain a greater amount of information regarding the camera shake detection signals than in a case where the imaging apparatus 200 includes only either one. As a result, it is possible to make an image stabilization and determine the type of shake with high accuracy. Thus, in one embodiment, the imaging apparatus 200 should include both the camera angular velocity sensor 208 and the camera acceleration sensor 209.

The lens apparatus 100 includes the imaging optical system, driving motors that drive the imaging optical system, and control circuits that control the driving motors. The lens apparatus 100 also includes a lens MPU 101, a lens communication unit 102, a lens angular velocity sensor 103, a lens acceleration sensor 104, and an image stabilizing lens encoder 105.

The imaging optical system includes an image stabilizing lens 106 and a focus lens 107. The driving motors that drive the imaging optical system include an image stabilizing lens driving motor 108 and a focus lens driving motor 109. The control circuits that control the driving motors include a lens image stabilizing control unit 110 and a focus lens control unit 111.

The lens MPU 101 controls the operation of the components in the lens apparatus 100. The lens MPU 101 also communicates with the imaging apparatus 200 via the lens communication unit 102 and exchanges data with the imaging apparatus 200. Although the lens MPU 101 is an MPU in the present exemplary embodiment, various circuits or processors such as a CPU may be used.

The lens angular velocity sensor 103 outputs an angular velocity signal regarding the angular velocity of the lens apparatus 100. The lens acceleration sensor 104 outputs an acceleration signal regarding the acceleration of the lens apparatus 100. The angular velocity signal output from the lens angular velocity sensor 103 and the acceleration signal output from the lens acceleration sensor 104 are input as lens shake detection signals to the lens MPU 101. Using the lens shake detection signals, the lens MPU 101 calculates a driving target signal for driving the image stabilizing lens 106. An image stabilizing signal based on the difference between a position signal of the image stabilizing lens 106 output from the image stabilizing lens encoder 105 and the driving target signal is output to the lens image stabilizing control unit 110. The lens image stabilizing control unit 110 drives the image stabilizing lens driving motor 108 based on the image stabilizing signal, thereby moving the image stabilizing lens 106, which is a part of the imaging optical system, in a direction orthogonal to the optical axis of the imaging optical system. This movement of the image stabilizing lens 106 reduces the blur of an image caused by the shake of the imaging system.

Using a control signal received from the lens MPU 101 and the focus lens driving motor 109, the focus lens control unit 111 moves the focus lens 107 in the direction of the optical axis, thereby adjusting the focus. The focus lens control unit 111 includes a circuit that drives the focus lens 107, and a focus encoder that outputs a zone pattern signal or a pulse signal according to the movement of the focus lens 107. The object distance can be detected based on the output of the focus encoder.

Instead of the camera shake detection signals, the lens shake detection signal output from at least one of the lens angular velocity sensor 103 and the lens acceleration sensor 104 may be input to the camera MPU 206. The camera MPU 206 acquires the lens shake detection signal from the lens MPU 101 via the camera communication unit 207. In this case, the camera angular velocity sensor 208 and the camera acceleration sensor 209 may not be provided in the imaging apparatus 200.

Figure 2:
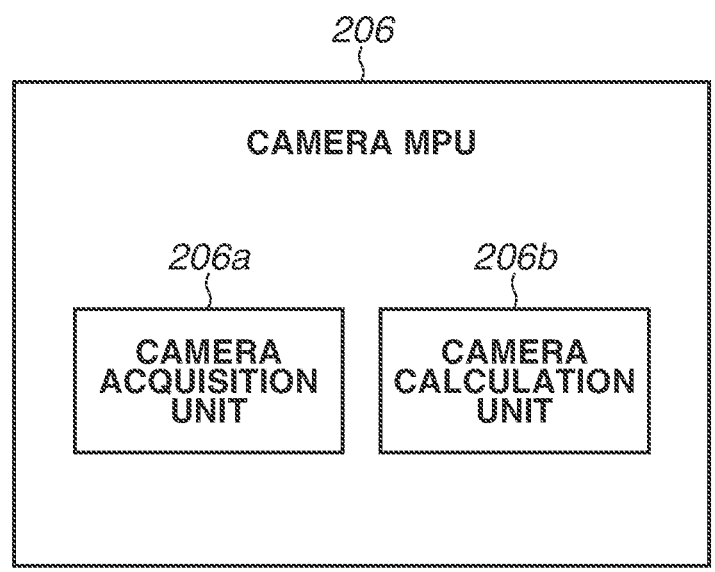
FIG. 2 is a block diagram illustrating functions of a micro-processing unit (MPU) included in an imaging apparatus.

The functions of the camera MPU 206 will now be described with reference to FIG. 2. In the present exemplary embodiment, the functions of the camera MPU 206 determine the type of shake using information regarding camera shake detection signals.

The type of the shake is also determined using a machine learning model to improve the accuracy of the determination of the type of the shake.

The camera MPU 206 includes a camera acquisition unit 206*a* and a camera calculation unit 206*b*.

The camera acquisition unit 206*a* acquires first information regarding shake. In the present exemplary embodiment, the camera acquisition unit 206*a* acquires feature amounts of preprocessed camera shake detection signals as the first information.

The camera calculation unit 206*b* inputs the first information acquired by the camera acquisition unit 206*a* to a machine learning model and outputs information regarding the type of the shake as second information.

In general, however, processing using a machine learning model requires high calculation load. Thus, in a case where the machine learning model is used to determine the type of the shake, a determination process in which the camera calculation unit 206*b* determines the type of the shake may require a longer time than in a conventional method. In this case, delay may occur during the period from when a user gives an image capturing instruction through the operation unit 205 in the capturing of a still image to when the capturing of the image is actually started. This is because the camera image stabilizing control unit 211 makes an image stabilization after waiting for the completion of the determination process in which the camera calculation unit 206*b* determines the type of the shake.

In the present exemplary embodiment, information regarding the type of the shake determined by the camera calculation unit 206*b* before the user gives an image capturing instruction through the operation unit 205 is therefore used for an image stabilization to be performed after the user gives the image capturing instruction. This eliminates the need for the camera image stabilizing control unit 211 to wait for the completion of the determination process in which the camera calculation unit 206*b* determines the type of the shake after the image capturing instruction is given. As a result, it is possible to determine, even in the capturing of a still image, the type of shake with high accuracy using a machine learning model and also reduce delay when a still image is captured.

Figure 3:
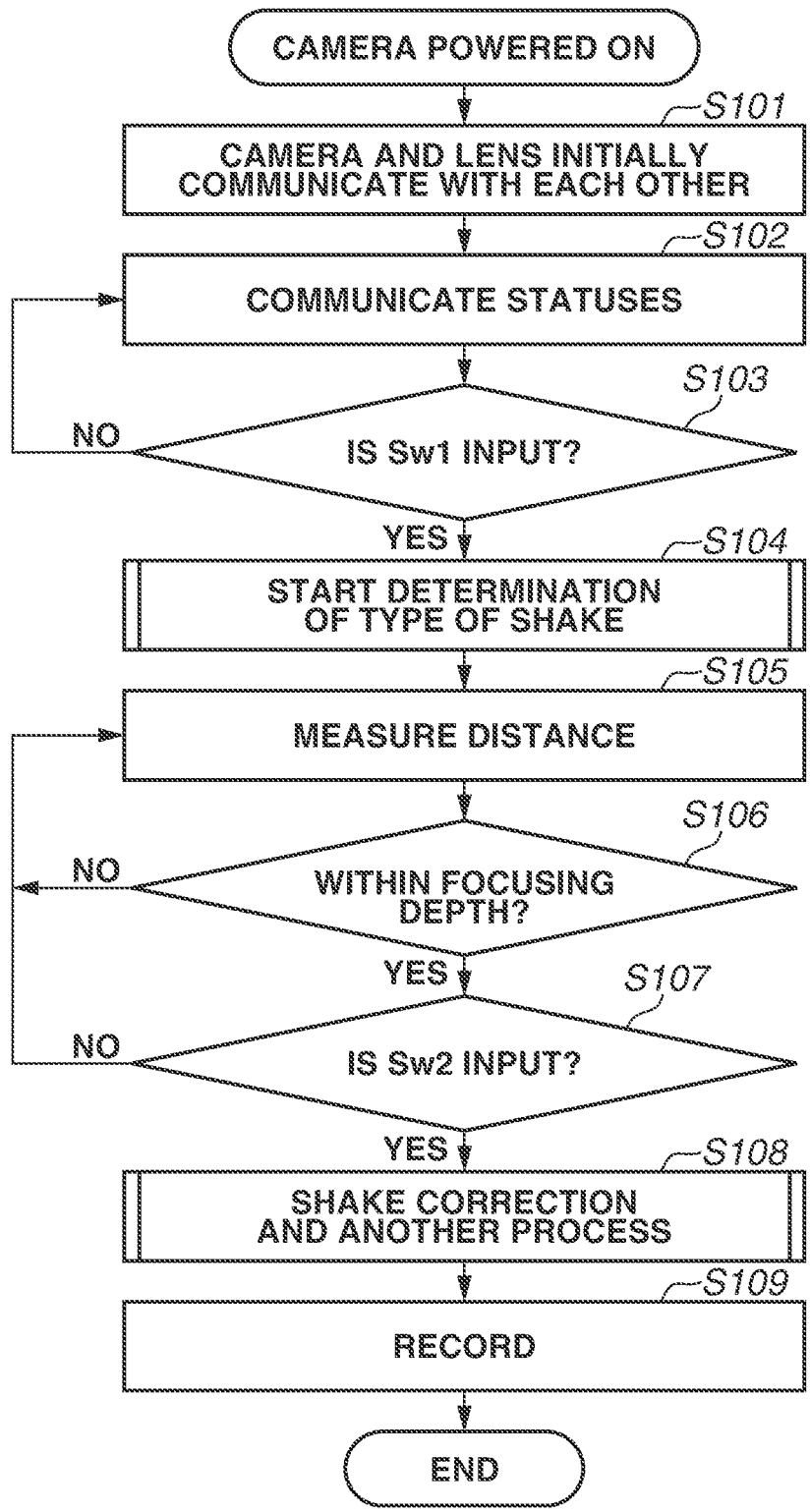
FIG. 3 is a flowchart illustrating an image capturing operation according to a first exemplary embodiment.

An image capturing operation according to the first exemplary embodiment will now be described with reference to a flowchart illustrated in FIG. 3. The flowchart in FIG. 3 starts if the imaging apparatus 200 is powered on. In the present exemplary embodiment, the imaging apparatus 200 makes an image stabilization and determines the type of shake. Thus, the image stabilizing lens encoder 105, the image stabilizing lens 106, the image stabilizing lens driving motor 108, and the lens image stabilizing control unit 110 may not be provided in the lens apparatus 100.

In step S101, the imaging apparatus 200 initially communicates with the lens apparatus 100 and distinguishes the model of the lens apparatus 100. At this time, the lens apparatus 100 distinguishes the model of the imaging apparatus 200.

In step S102, the camera MPU 206 communicates statuses with the lens MPU 101 via the camera communication unit 207. The camera MPU 206 also transmits the state of the camera (e.g., an aperture value, and a shutter speed set by the user) to the lens MPU 101. The camera MPU 206 also receives the state of the lens (e.g., the current focal length, the state of a diaphragm, and the driving state of the focus lens 107) from the lens MPU 101.

In step S103, the camera MPU 206 determines whether a first shutter release signal Sw1 is input from the operation unit 205 to the camera MPU 206. If it is determined that the first shutter release signal Sw1 is input (YES in step S103), the processing proceeds to step S104. If it is determined that the first shutter release signal Sw1 is not input (NO in step S103), the processing returns to step S102.

In step S104, the camera calculation unit 206*b* starts the determination of the type of shake using a machine learning model. The camera calculation unit 206*b* records information regarding the determined type of the shake in the camera MPU 206. The camera calculation unit 206*b* continuously determines the type of the shake using machine learning up to step S109. The details of step S104 will be described below.

In step S105, the camera MPU 206 measures a distance for focusing on an object and calculates a driving amount of the focus lens 107. The camera MPU 206 transmits the calculated driving amount of the focus lens 107 to the focus lens control unit 111.

In step S106, the camera MPU 206 measures the distance again. If it is determined that the distance is within a focusing depth (YES in step S106), the processing proceeds to step S107. If the distance is outside the focusing depth (NO in step S106), the processing returns to step S105.

In step S107, the camera MPU 206 determines whether a second shutter release signal Sw2 is input from the operation unit 205 to the camera MPU 206. If it is determined that the second shutter release signal Sw2 is input (YES in step S107), the processing proceeds to step S108. In contrast, if it is determined that the second shutter release signal Sw2 is not input (NO in step S107), the processing returns to step S105.

In step S108, the camera image stabilizing control unit 211 makes an image stabilization. The image stabilization is made based on the result of the determination of the type of the shake made by the camera calculation unit 206*b* before the second shutter release signal Sw2 is input to the camera MPU 206. Thus, it is possible to shorten the time from when the second shutter release signal Sw2 is input to the camera MPU 206 to when the image stabilization is started by the camera image stabilizing control unit 211. In step S108, the diaphragm (not illustrated) included in the lens apparatus 100 is also driven, and a shutter (not illustrated) included in the imaging apparatus 200 is also driven. A description will be given below of the details of a process regarding the image stabilization based on the result of the determination of the type of the shake performed in step S108.

In step S109, the signal processing circuit 202 reads a signal from the image sensor 201. The read signal is converted into digital data, and the digital data is saved in the external memory (not illustrated) by the recording processing unit 203. The camera calculation unit 206*b* also stops the determination process for determining the type of the shake.

Figure 4:
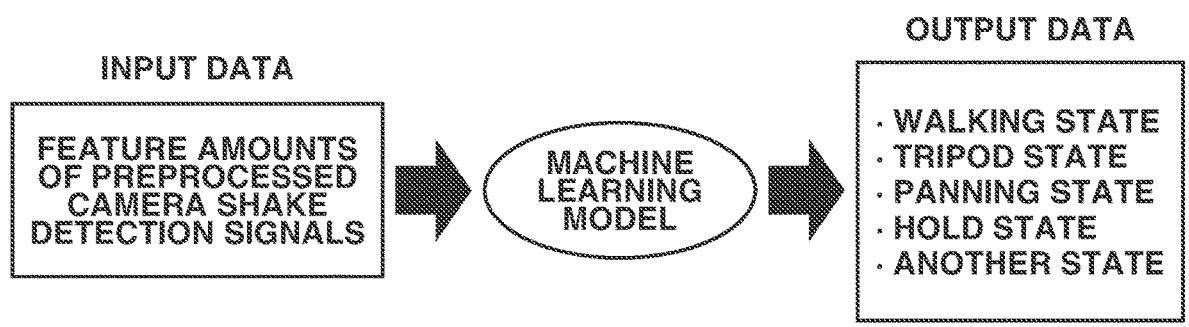
FIG. 4 is a conceptual diagram illustrating a machine learning model.

The machine learning model will now be described. FIG. 4 is a conceptual diagram illustrating the relationship between the input and output of the machine learning model according to the present exemplary embodiment. The machine learning model used in the present exemplary embodiment is an algorithm for, based on input data, outputting a class to which the input data belongs.

The machine learning model has a learning phase and an estimation phase. In the learning phase, a parameter in the machine learning model is updated to improve the accuracy of the determination of a class for input data. A "class" is associated with the type of shake and is a predetermined number of categories defined in advance. Data obtained by combining the input data and a correct answer label indicating the class of the input data is referred to as "teacher data". Learning is performed as follows. The teacher data is input to the machine learning model, and the machine learning model determines a class. Then, the machine learning model compares the obtained determined class and the class indicated by the correct answer label and updates the parameter in the machine learning model to minimize the difference (loss) between the classes. In the learning phase, the learning is performed a predetermined number of times. Or the learning is repeated until an end condition is satisfied, for example, by reaching a predetermined determination accuracy. Using the thus obtained trained machine learning model in the estimation phase, the camera calculation unit 206b can determine the type of shake with high accuracy based on the input data.

In the present exemplary embodiment, a random forest is used as the machine learning model. The random forest is an algorithm using a feature amount as input data. Thus, input data as first information according to the present exemplary embodiment is feature amounts of preprocessed camera shake detection signals. As the algorithm of the machine learning model, logistic regression, a support-vector machine, naive Bayes, a neural network, or a state-space model may be used.

The input data as the first information may be appropriately changed according to the algorithm. In this case, possible examples of the input data as the first information include the camera shake detection signals that are only preprocessed, the camera shake detection signals that are not preprocessed, and feature amounts of the camera shake detection signals that are not preprocessed. Alternatively, as the first information, information regarding a motion vector obtained from the image sensor 201 may be used, instead of the camera shake detection signals.

For example, in a case where an algorithm that does not require feature amounts, such as a neural network, is used as the machine learning model, the camera shake detection signals are used as the first information without generating feature amounts. In this case, preprocessing on the camera shake detection signals is not essential.

Preprocessing on and feature amounts of the camera shake detection signals according to the present exemplary embodiment will now be described. The contents of the preprocessing and the feature amounts may be appropriately changed according to the learning environment.

In the preprocessing, a standardization process is performed on the camera shake detection signals, unit conversion is performed on the camera shake detection signals, and a missing value and an outlier in the camera shake detection signals are removed.

The standardization process is a process of converting the camera shake detection signals so that the average of data is 0, and the variance of the data is 1. The unit conversion is a process of matching the resolutions of the angular velocity signal and the acceleration signal as the camera shake detection signals. The standardization process and the unit conversion are processes performed to improve the accuracy of learning by matching the scales of the camera shake detection signals.

The missing value is empty data that occurs due to a detection error in the camera angular velocity sensor 208 or the camera acceleration sensor 209. The outlier is data that is extremely different in value from another piece of data in the camera shake detection signals. The outlier and the missing value cause a decrease in the accuracy of learning. Thus, the camera MPU 206 detects and excludes the outlier and the missing value from the shake detection signals, thereby preventing the outlier and the missing value from being input to the machine learning model.

Examples of the feature amounts include the average value, the maximum value, the minimum value, the root sum, the variance, the standard deviation, the kurtosis, and the skewness of the camera shake detection signals.

Output data as second information according to the present exemplary embodiment is any of types of shake, such as a walking state, a tripod state, a panning state, a hold state, and another state. A class to be output from the machine learning model may be the walking state, the tripod state, or the panning state, and the result of the output may be set as it is as the type of shake. Alternatively, classes may be defined as a large shake, a vertical shake, a horizontal shake, and a minute shake. Then, the large shake may be associated with the walking state. The vertical shake and the horizontal shake may be associated with the panning state. The minute shake may be associated with the tripod state. The types of shake to be determined are not limited to the above five types, and a type of shake may be added or changed.

The details of the learning phase of the machine learning model according to the present exemplary embodiment will now be described. As input data when learning was performed, image capturing records regarding the walking state, the tripod state, the panning state, the hold state, and another state were used.

In the walking state, an image was captured under the condition of four types of moving directions, namely forward, backward, leftward, and rightward directions. The image capturing time varies from photographer to photographer.

In the tripod state, an image was captured for 2 minutes and 30 seconds, in the state where the imaging apparatus 200 was placed on a tripod, while changing the combination of three types of image capturing angles, namely upward, horizontal, and downward angles, and two types of orientations of the imaging apparatus 200, namely vertical and horizontal orientations.

In the panning state, an image was captured for one minute while changing the combinations of two types of directions, namely left and right directions, two types of orientations of the imaging apparatus 200, namely vertical and horizontal orientations, and two types of methods for holding the imaging apparatus 200, namely handheld and tripod methods.

In the hold state, an image was captured for two minutes while changing the combination of two types of orientations, namely a state where a photographer stood and a state where the photographer placed their elbows, and two types of image capturing methods, namely live view image capturing and image capturing while the photographer looked into the viewfinder. The hold state is a state where the photographer firmly holds up the camera, whereby shake is relatively small even though handheld image capturing is performed.

In another state, in a state where the imaging apparatus 200 was placed on a shake table (not illustrated) and a vibration was generated, an image was captured for 2 minutes and 30 seconds. "Another state" refers to a state that does not correspond to any of the walking state, the tripod state, the panning state, and the hold state.

The input data is divided into learning data and test data. The test data is data for confirming the accuracy of the determination of the trained machine learning model trained using the learning data. At this time, data on the same human subject is sorted into one of the learning data and the test data. This is to prevent the accuracy of the determination from being unreasonably high because data on the same human subject is likely to lead to a correct answer.

The accuracy of the determination of the type of shake using the machine learning model according to the present exemplary embodiment will now be described with reference to FIG. 5. The accuracy of the determination of the type of shake using the machine learning model had accuracy rates of 100 percent in the walking state, 49 percent in the tripod state, 88 percent in the panning state, 99 percent in the hold state, and 100 percent in another state. The accuracy of the determination of the type of shake indicates very high accuracy rates particularly in the walking state, the panning state, the hold state, and another state.

Figure 6:
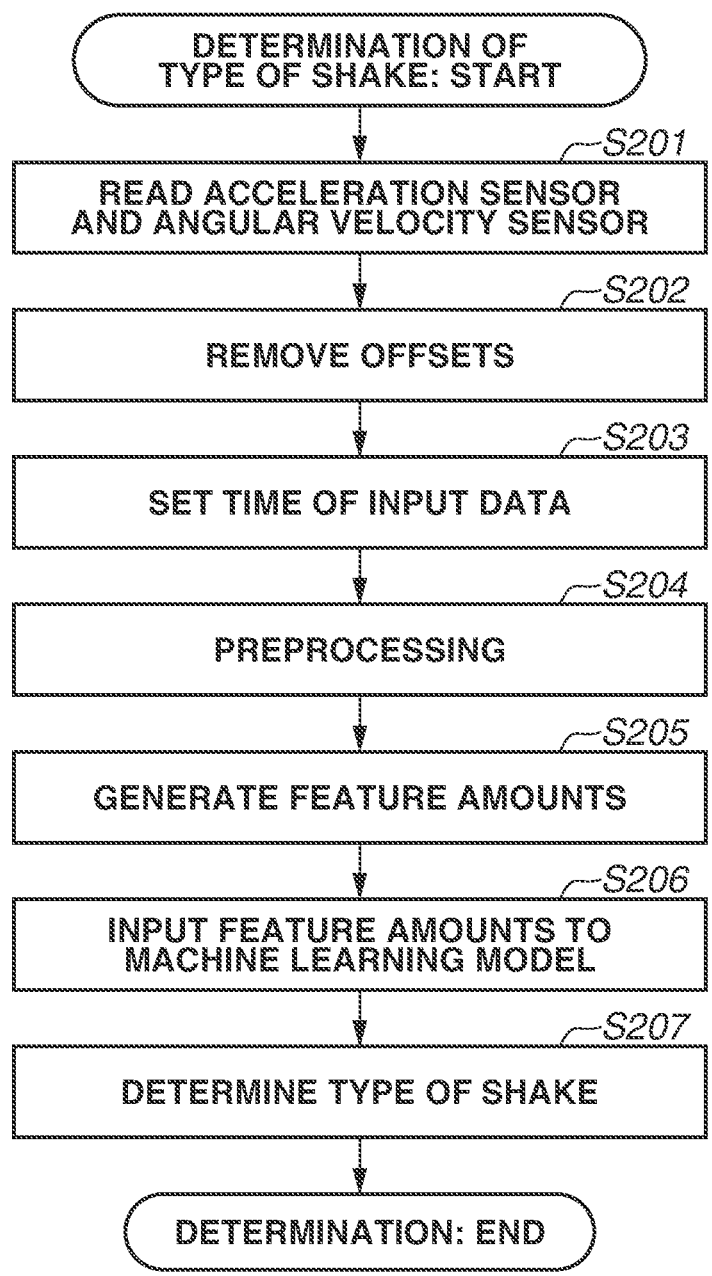
FIG. 6 is a flowchart illustrating a determination process for determining a type of shake.

A description will now be given of the method for determining the type of the shake using the machine learning model in step S104 in FIG. 3, with reference to a flowchart in FIG. 6.

In step S201, the camera MPU 206 acquires camera shake detection signals from the camera angular velocity sensor 208 and the camera acceleration sensor 209.

In step S202, the camera MPU 206 reads the offsets of the sensors from a non-volatile memory (not illustrated) and subtracts values corresponding to the offsets from the camera shake detection signals.

In step S203, the camera MPU 206 sets information regarding the camera shake detection signals from which the offsets are removed, so that the information is input as time series data having a predetermined length to the machine learning model. An appropriate length of the time series data may be 0.1 seconds or more and 5.0 seconds or less. If the time series data exceeds 5.0 seconds, it takes too much time to acquire data used to determine the type of the shake, which is not desirable. If the time series data is less than 0.1 seconds, sufficient accuracy cannot be obtained, which is not desirable. To determine the type of the shake within an image capturing time, in one embodiment, a length of the time series data is 0.1 seconds or more and 0.4 seconds or less.

In step S204, the camera MPU 206 preprocesses the camera shake detection signals.

In step S205, the camera MPU 206 generates feature amounts of the preprocessed camera shake detection signals. The camera acquisition unit 206a acquires the feature amounts of the preprocessed camera shake detection signals.

In step S206, the camera calculation unit 206b inputs the feature amounts of the preprocessed camera shake detection signals as first information to the machine learning model.

In step S207, the camera calculation unit 206b determines the type of the shake as second information, based on a class output from the machine learning model.

Figure 7:
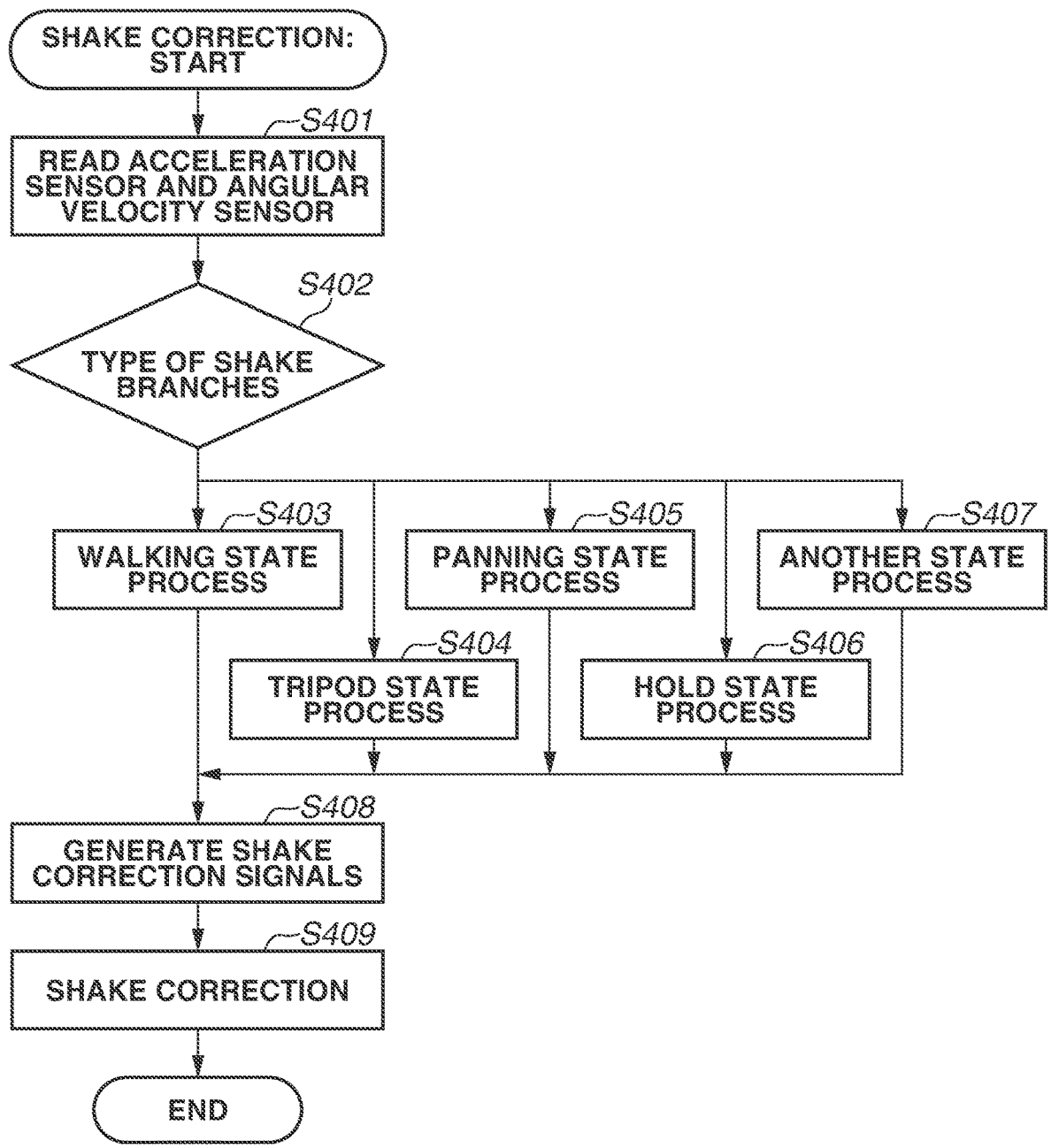
FIG. 7 is a flowchart illustrating an image stabilizing process.

A description will now be given of the process regarding the image stabilization based on the determination result of the type of the shake using the machine learning model in step S108 in FIG. 3 with reference to a flowchart in FIG. 7.

In step S401, the camera MPU 206 acquires camera shake detection signals from the camera angular velocity sensor 208 and the camera acceleration sensor 209.

In step S402, the camera MPU 206 switches processes on the camera shake detection signals based on the determination result of the type of the shake. If the type of the shake is the walking state, the processing proceeds to step S403. If the type of the shake is the tripod state, the processing proceeds to step S404. If the type of the shake is the panning state, the processing proceeds to step S405. If the type of the shake is the hold state, the processing proceeds to step S406. If the type of the shake is another state, the processing proceeds to step S407.

In step S403, the camera MPU 206 sets a cutoff frequency in a low-pass filter calculation on the camera shake detection signals such that the cutoff frequency is high in the state where the values of the camera shake detection signals are greater than those in the other states. This is because an image blur larger than those in the other states occurs in the walking state.

In step S404, the camera MPU 206 sets a cutoff frequency in a high-pass filter calculation on the camera shake detection signals such that the cutoff frequency is higher than those in the other states. This is to prevent an erroneous image stabilization due to the offsets of the sensors because shake at a low frequency is less likely to occur in the tripod state.

In step S405, the camera MPU 206 transmits to the camera image stabilizing control unit 211 a driving signal for driving the image sensor 201 to gradually return to the center position of the optical axis spending a predetermined time. As a result, it is possible to stop the motion of the image sensor 201 for an image stabilization. This is to prevent an intentional motion of the photographer from being corrected as shake. The camera image stabilizing control unit 211 may stop an image stabilization in the panning direction and drive the image sensor 201 to make an image stabilization in a direction other than the panning direction.

In step S406, the camera MPU 206 detects a signal regarding a low frequency shake from vector information obtained from the image sensor 201 and adds the signal to a position signal of the image sensor 201 output from the image sensor encoder 212. If it is determined that the type of the shake is the hold state, the accuracy of the image stabilization at a low frequency is more improved than those in the other states.

In step S407, the camera MPU 206 sets the cutoff frequency in the low-pass filter calculation on the camera shake detection signals such that the cutoff frequency is high in the state where the values of the camera shake detection signals are smaller than those in the walking state.

In step S408, the camera MPU 206 generates an image stabilizing signal. Using the camera shake detection signals subjected to any of the processes of steps S403 to S407, the camera MPU 206 calculates a driving target signal for driving the image sensor 201. An image stabilizing signal according to the difference between the driving target signal and a position signal of the image sensor 201 output from the image sensor encoder 212 is generated.

In step S409, the camera image stabilizing control unit 211 acquires the image stabilizing signal from the camera MPU 206 and makes an image stabilization.

As described above, according to the image capturing operation described in the first exemplary embodiment of the disclosure, it is possible to determine the type of shake with high accuracy using a machine learning model and reduce delay when a still image is captured.

In the present exemplary embodiment, the imaging apparatus 200 makes an image stabilization and determines the type of shake. In the present exemplary embodiment, however, the lens apparatus 100 may make an image stabilization and determine the type of shake. In such a case, a function for determining the type of shake is provided in the lens MPU 101, instead of the camera MPU 206. The lens apparatus 100 uses the lens image stabilizing control unit 110, instead of the camera image stabilizing control unit 211 that controls an image stabilization. The lens apparatus 100 uses the image stabilizing lens 106, instead of the image sensor 201 as a driving target member that corrects shake by moving in the direction of the optical axis of the imaging optical system. The lens apparatus 100 uses the image stabilizing lens driving motor 108 that drives the image stabilizing lens 106, instead of the image sensor driving motor 210 that drives the image sensor 201. The lens apparatus 100 uses the image stabilizing lens encoder 105 that outputs a position signal of the image stabilizing lens 106, instead of the image sensor encoder 212 that outputs a position signal of the image sensor 201.

In the present exemplary embodiment, the type of shake may be determined using time series data having a first length and time series data having a second length longer than the first length as the inputs of the machine learning model. In such a case, the camera calculation unit 206b determines the type of shake based on the time series data having the first length and the type of shake based on the time series data having the second length. The camera image stabilization control unit 211 then makes an image stabilization using at least one of the type of the shake based on the time series data having the first length and the type of the shake based on the time series data having the second length.

In such a case, the determination of the type of the shake based on the time series data having the first length is excellent in that it takes a short time to acquire data used to make the determination. The accuracy of the determination of the type of the shake, however, is relatively low. On the other hand, the accuracy of estimation in the determination of the type of the shake is relatively high in the determination of the type of the shake based on the time series data having the second length, but it takes time to acquire data used to make the determination. As described above, the benefit of the determination of the type of the shake based on the time series data having the first length and the benefit of the determination of the type of the shake based on the time series data having the second length have a trade-off relationship.

Thus, to determine the type of the shake based on the time series data having the first length and determine the type of the shake based on the time series data having the second length. It is thereby possible to determine the type of shake with high accuracy and also determine the type of the shake based on the time series data having the first length during the acquisition period of the time series data having the second length. However, the type of the shake based on the time series data having the first length may be able to be used for an image stabilization even after the type of the shake based on the time series data having the second length is output. This is for the purpose of instantaneously switching the type of shake used for the image stabilization when the type of shake changes. In one embodiment, the first length is 0.1 seconds or more and 0.4 seconds or less, and the second length is greater than 0.4 seconds and 5.0 seconds or less. Alternatively, the time series data having the first length and the time series data having the second length may be input to different machine learning models, and the types of shake may be determined. In such a case, a machine learning model that has performed learning suitable for inputting the time series data having the first length and a machine learning model that has performed learning suitable for inputting the time series data having the second length may be used.

In the present exemplary embodiment, an optical image stabilization is made by driving the image sensor 201. In the present exemplary embodiment, however, an electronic image stabilization may be made, instead of the optical image stabilization. In such a case, the imaging apparatus 200 does not need to include the image sensor driving motor 210, and therefore, it is effective in saving space in the imaging apparatus 200.

Similarly to the optical image stabilization, the electronic image stabilization is made using camera shake detection signals. In such a case, the camera MPU 206 may acquire lens shake detection signals from the lens angular velocity sensor 103 and the lens acceleration sensor 104, instead of the camera shake detection signals. The camera MPU 206 calculates an image stabilizing amount based on the camera shake detection signals. The image stabilizing control unit 211 then clips a frame image based on the image stabilizing amount from an image displayed on the display unit 204 or an image recorded in the external memory (not illustrated), thereby making the image stabilization.

In the present exemplary embodiment, an image stabilization may be made using vector information indicating the moving direction and the moving velocity of the object. The vector information is calculated from the image sensor 201. The camera image stabilizing control unit 211 then moves the image sensor 201 in a direction orthogonal to the optical axis of the imaging optical system in the lens apparatus 100 based on the vector information, thereby making the image stabilization.

A second exemplary embodiment will now be described.

In the first exemplary embodiment, the imaging apparatus 200 determines the type of shake and makes an image stabilization. In contrast, in the second exemplary embodiment, the imaging apparatus 200 determines the type of shake, and the lens apparatus 100 makes an image stabilization. That is, the first and second exemplary embodiments are different from each other in that in the first exemplary embodiment, the same electronic device makes the determination of the type of shake and an image stabilization, whereas in the second exemplary embodiment, different electronic devices make the determination of the type of shake and an image stabilization. The image sensor encoder 212, the image sensor driving motor 210, and the camera image stabilizing control unit 211 may thereby not be provided in the imaging apparatus 200 according to the present exemplary embodiment.

Figure 8:
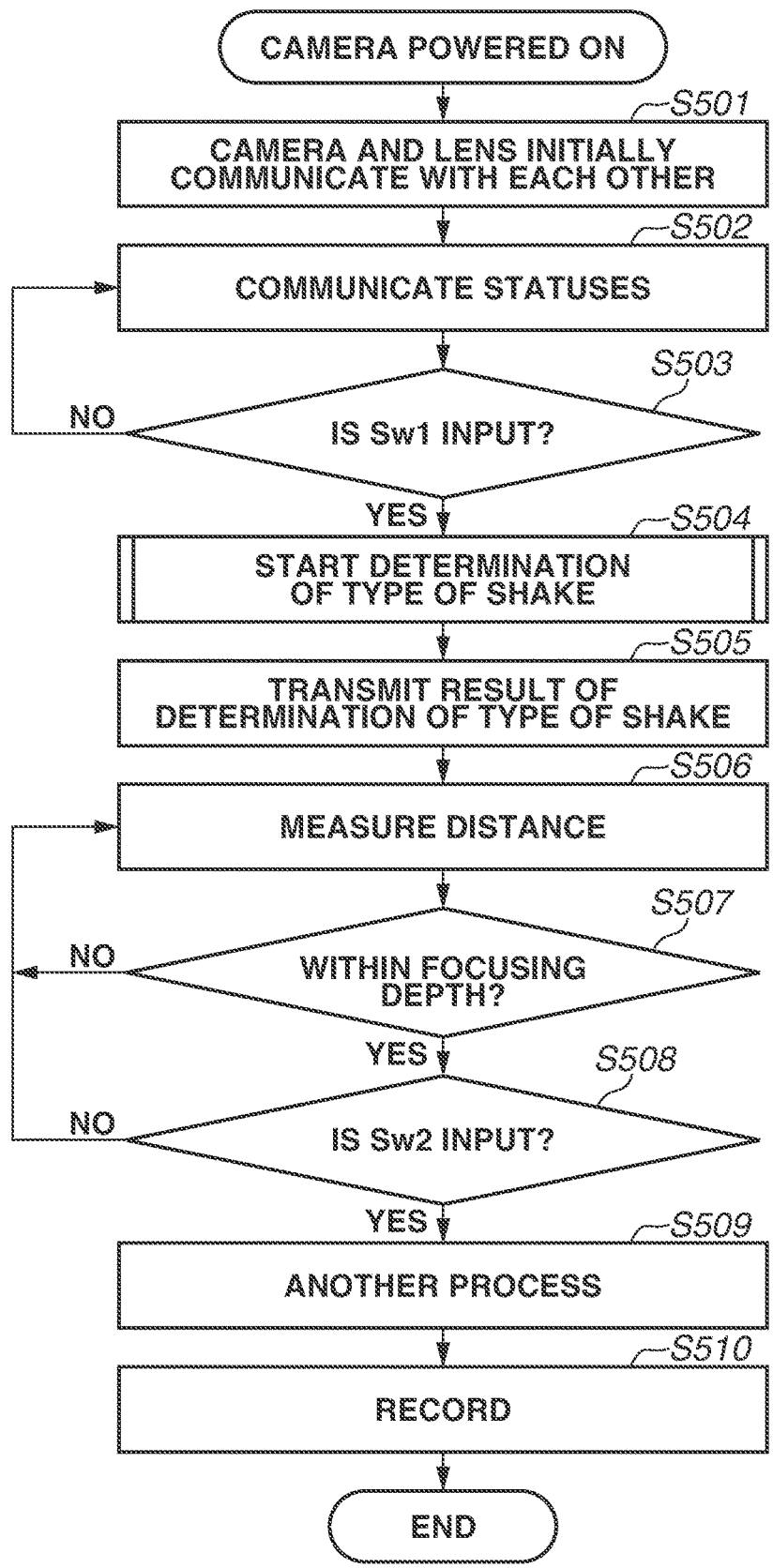
FIG. 8 is a flowchart illustrating an image capturing operation according to a second exemplary embodiment.

An image capturing operation according to the second exemplary embodiment will now be described with reference to a flowchart in FIG. 8. The processes of steps S501 to S504 in FIG. 8 are similar to those of steps S101 to S104 in FIG. 3, and therefore are not described. The processes of steps S506 to S508 in FIG. 8 are similar to those of steps S105 to S107 in FIG. 3, and therefore are not described. The process of step S510 in FIG. 8 is similar to that of step S109 in FIG. 3, and therefore is not described.

In step S505, the camera MPU 206 transmits the information regarding the type of the shake determined by the camera calculation unit 206b to the lens MPU 101. At this time, the lens MPU 101 records the result of the determination of the type of the shake. The camera MPU 206 continuously transmits the information regarding the type of the shake to the lens MPU 101 up to step S510.

In step S509, the camera MPU 206 performs, for example, driving the shutter (not illustrated) included in the imaging apparatus 200. At this time, the diaphragm (not illustrated) included in the lens apparatus 100 is driven. In step S509, the lens image stabilizing control unit 110 also makes an image stabilization. The image stabilization is made based on the result of the determination of the type of the shake made by the camera calculation unit 206b before the second shutter release signal Sw2 is input to the camera MPU 206.

As described above, it is possible to determine the type of shake with high accuracy using a machine learning model and reduce delay when a still image is captured, according to the image capturing operation in a case where different electronic devices make an image stabilization and the determination of the type of shake that is described in the second exemplary embodiment of the disclosure.

In the present exemplary embodiment, the imaging apparatus 200 determines the type of shake, and the lens apparatus 100 makes an image stabilization. In the present exemplary embodiment, however, the lens apparatus 100 may determine the type of shake, and the imaging apparatus 200 may make an image stabilization. In such a case, a function for determining the type of shake is provided in the lens MPU 101, instead of the camera MPU 206. The imaging apparatus 200 uses the camera image stabilizing control unit 211, instead of the lens image stabilizing control unit 110 that controls an image stabilization. The imaging apparatus 200 uses the image sensor 201, instead of the image stabilizing lens 106 that corrects shake by moving in the direction of the optical axis of the imaging optical system. The imaging apparatus 200 uses the image sensor driving motor 210 that drives the image sensor 201, instead of the image stabilizing lens driving motor 108 that drives the image stabilizing lens 106. The imaging apparatus 200 uses the image sensor encoder 212 that outputs a position signal of the image sensor 201, instead of the image stabilizing lens encoder 105 that outputs a position signal of the image stabilizing lens 106.

A third exemplary embodiment will now be described.

In the first exemplary embodiment, large calculation load is devoted to the determination of the type of shake by the camera calculation unit 206b even after the user gives an image capturing instruction. In contrast, in the third exemplary embodiment, the camera calculation unit 206b stops the determination of the type of shake after the user gives a still image capturing instruction.

In the present exemplary embodiment, it is thereby possible to reduce calculation load after the user gives an image capturing instruction. In the present exemplary embodiment, it is possible to reduce delay from when a still image capturing instruction is given due to the determination of the type of shake to when an image is captured more than in the first exemplary embodiment, accordingly.

In the present exemplary embodiment, the imaging apparatus 200 makes an image stabilization and determines the type of shake. Thus, the image stabilizing lens encoder 105, the image stabilizing lens 106, the image stabilizing lens driving motor 108, and the lens image stabilizing control unit 110 may not be provided in the lens apparatus 100.

Figure 9:
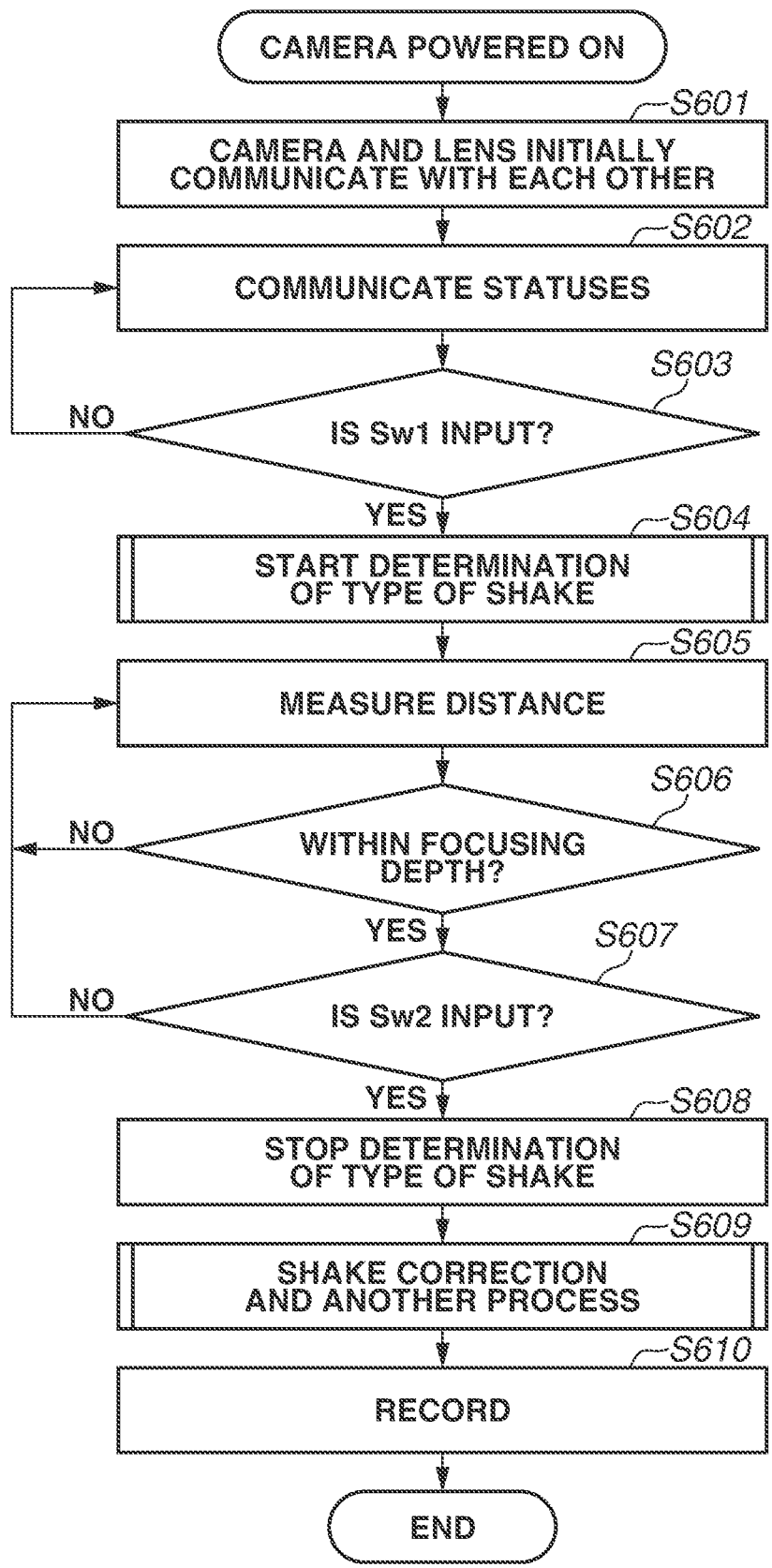
FIG. 9 is a flowchart illustrating an image capturing operation according to a third exemplary embodiment.

An image capturing operation according to the third exemplary embodiment of the disclosure will now be described with reference to a flowchart in FIG. 9. The processes of steps S601 to S603 in FIG. 9 are similar to those of steps S101 to S103 in FIG. 3, and therefore are not described. The processes of steps S605 to S607 in FIG. 9 are similar to those of steps S105 to S107 in FIG. 3, and therefore are not described. The processes of steps S609 and S610 in FIG. 9 are similar to those of steps S108 and S109 in FIG. 3, and therefore are not described.

In step S604, the camera calculation unit 206b starts the determination of the type of shake using the machine learning model. The camera calculation unit 206b records information regarding the determined type of the shake in the camera MPU 206. The camera calculation unit 206b continuously determines the type of the shake using machine learning until the determination is stopped in step S608.

In step S608, the camera calculation unit 206b stops the determination of the type of the shake. Thus, it is possible to reduce calculation load in the camera calculation unit 206b.

As described above, the determination of the type of shake after an image capturing instruction is given is stopped, whereby it is possible to reduce delay when a still image is captured more than in the first exemplary embodiment, according to the image capturing operation described in the third exemplary embodiment of the disclosure.

In the present exemplary embodiment, the imaging apparatus 200 makes an image stabilization and determines the type of shake. In the present exemplary embodiment, however, the lens apparatus 100 may make an image stabilization and determine the type of shake. In this case, a function for determining the type of shake is provided in the lens MPU 101, instead of the camera MPU 206. In step S607, the lens MPU 101 acquires information regarding the giving of an image capturing instruction from the camera MPU 206 and stops the determination of the type of the shake.

The lens apparatus 100 uses the lens image stabilizing control unit 110, instead of the camera image stabilization control unit 211 that controls an image stabilization. The lens apparatus 100 uses the image stabilizing lens 106, instead of the image sensor 201 as a driving target member that corrects shake by moving in the direction of the optical axis of the imaging optical system. The lens apparatus 100 uses the image stabilizing lens driving motor 108 that drives the image stabilizing lens 106, instead of the image sensor driving motor 210 that drives the image sensor 201. The lens apparatus 100 uses the image stabilizing lens encoder 105 that outputs a position signal of the image stabilizing lens 106, instead of the image sensor encoder 212 that outputs a position signal of the image sensor 201.

The present exemplary embodiment may be applied to a configuration in a case where different electronic devices make the determination of the type of shake and an image stabilization as described in the second exemplary embodiment.

A fourth exemplary embodiment will now be described.

In a fourth exemplary embodiment, the camera MPU 206 determines the type of shake, and the imaging apparatus 200 and the lens apparatus 100 make image stabilizing based on the result of the determination. In the present exemplary embodiment, using the correction ratio between the image stabilization to be made by the lens apparatus 100 and the image stabilization to be made by the imaging apparatus 200, it is possible to make an image stabilization with higher accuracy than that in the first exemplary embodiment.

Figure 10:
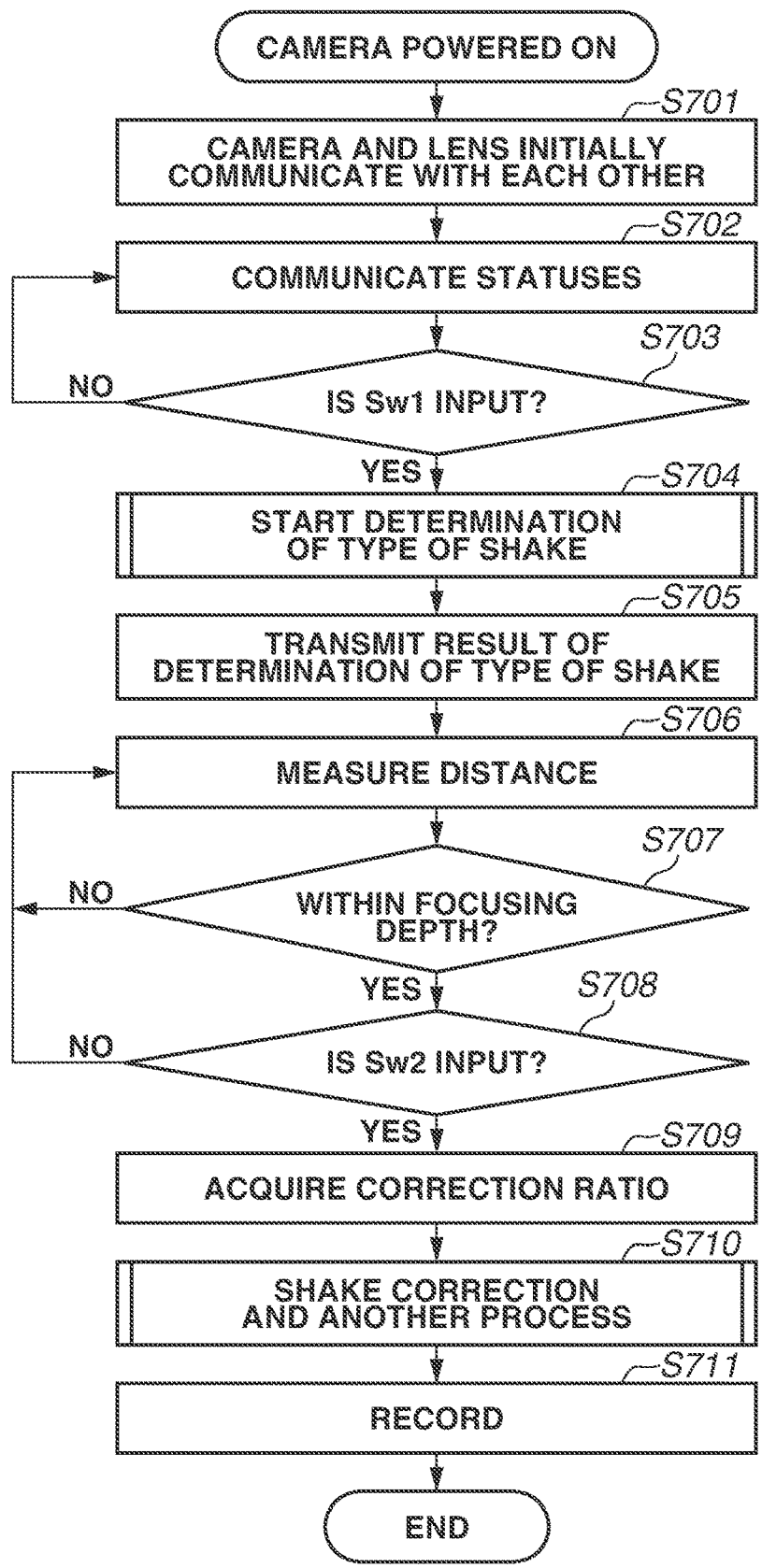
FIG. 10 is a flowchart illustrating an image capturing operation according to a fourth exemplary embodiment.

An image capturing operation according to the fourth exemplary embodiment will now be described. The processes of steps S701 to S704 in FIG. 10 are similar to those of steps S101 to S104 in FIG. 3, and therefore are not described. The processes of steps S706 to S708 in FIG. 10 are similar to those of steps S105 to S107 in FIG. 3, and therefore are not described. The process of step S711 in FIG. 10 is similar to that of step S109 in FIG. 3, and therefore is not described.

In step S705, the camera MPU 206 transmits the information regarding the determined type of the shake to the lens MPU 101.

In step S709, the camera MPU 206 acquires from the lens MPU 101 the correction ratio for an image stabilization to be made by the camera image stabilizing control unit 211. The correction ratio is the ratio between the amount of correction of shake to be made by the camera image stabilizing control unit 211 and the amount of correction of shake to be made by the lens image stabilizing control unit 110. The correction ratio is calculated by the lens MPU 101.

In step S710, the camera image stabilizing control unit 211 makes an image stabilization. At this time, the lens image stabilizing control unit 110 also makes an image stabilization. The image stabilizations by the camera image stabilizing control unit 211 and the lens image stabilizing control unit 110 are made based on the result of the determination of the type of the shake made before the correction ratio and the second shutter release signal Sw2 are input to the camera MPU 206. In step S710, the diaphragm (not illustrated) included in the lens apparatus 100 is also driven, and the shutter (not illustrated) included in the imaging apparatus 200 is also driven.

As described above, it is possible to determine the type of shake with high accuracy using a machine learning model and reduce delay when a still image is captured, according to the image capturing operation in a case where image stabilizations are made using a plurality of image stabilizing control units that is described in the fourth exemplary embodiment of the disclosure.

Although different electronic devices make the determination of the type of shake and the calculation of the correction ratio in the present exemplary embodiment, the same electronic device may make the determination of the type of shake and the calculation of the correction ratio. If different electronic devices make the determination of the type of shake and the calculation of the correction ratio, the imaging apparatus 200 and the lens apparatus 100 can share the determination of the type of shake and the calculation of the correction ratio. This enables efficient processing. Thus, in one embodiment, electronic devices are configured to make the determination of the type of shake and the calculation of the correction ratio.

In the present exemplary embodiment, the imaging apparatus 200 determines the type of shake. In the present exemplary embodiment, however, the lens apparatus 100 may determine the type of shake. In this case, a function for determining the type of shake is provided in the lens MPU 101, instead of the camera MPU 206.

In the present exemplary embodiment, the lens apparatus 100 calculates the correction ratio. In the present exemplary embodiment, however, the imaging apparatus 200 may calculate the correction ratio. In such a case, the camera MPU 206 transmits to the lens MPU 101 the correction ratio for an image stabilization to be made by the lens image stabilizing control unit 110.

In the present exemplary embodiment, the camera calculation unit 206b may stop the determination of the type of shake after an image capturing instruction is given similarly to the third exemplary embodiment.

A fifth exemplary embodiment will now be described.

In the fifth exemplary embodiment, the imaging apparatus 200 and the lens apparatus 100 determine the types of shake, and the imaging apparatus 200 makes an image stabilization. If the results of the determinations made by the imaging apparatus 200 and the lens apparatus 100 match each other, it can be determined that the results have high reliability. If the results of the determinations do not match each other, it can be determined that the results have low reliability. In the present exemplary embodiment, an image stabilization is made according to the results of the determinations if the result of the determination of the type of the shake made by the imaging apparatus 200 (second information) and the result of the determination of the type of the shake made by the lens apparatus 100 (third information) match each other. If the results of the determinations do not match each other, an image stabilization is made according to another state. As a result, only if the results of the determinations of the types of the shake have high reliability, it is possible to make an image stabilization according to the types of the shake. It is also possible to reduce the deterioration of the correction accuracy due to an image stabilization made according to the result of an erroneous determination of the type of shake.

In the present exemplary embodiment, the imaging apparatus 200 makes an image stabilization. Thus, the lens apparatus 100 may not include the image stabilizing lens encoder 105, the image stabilizing lens 106, the image stabilizing lens driving motor 108, and the lens image stabilizing control unit 110.

Figure 11:
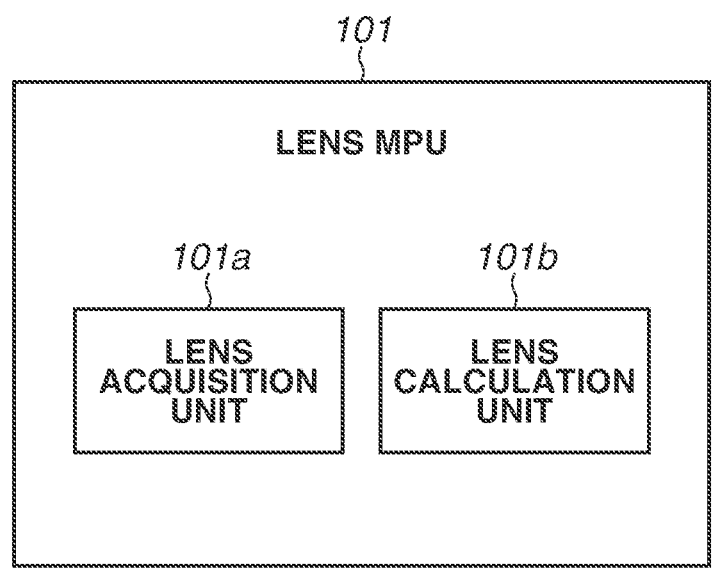
FIG. 11 is a block diagram illustrating functions of an MPU included in a lens apparatus.

FIG. 11 is a block diagram illustrating the functions of the lens MPU 101. The determination of the type of shake by the lens apparatus 100 according to the present exemplary embodiment is made using the functions illustrated in FIG. 11.

The lens MPU 101 includes a lens acquisition unit 101a and a lens calculation unit 101b. The lens acquisition unit 101a has a function similar to that of the camera acquisition unit 206a. The lens calculation unit 101b has a function similar to that of the camera calculation unit 206b.

Figure 12:
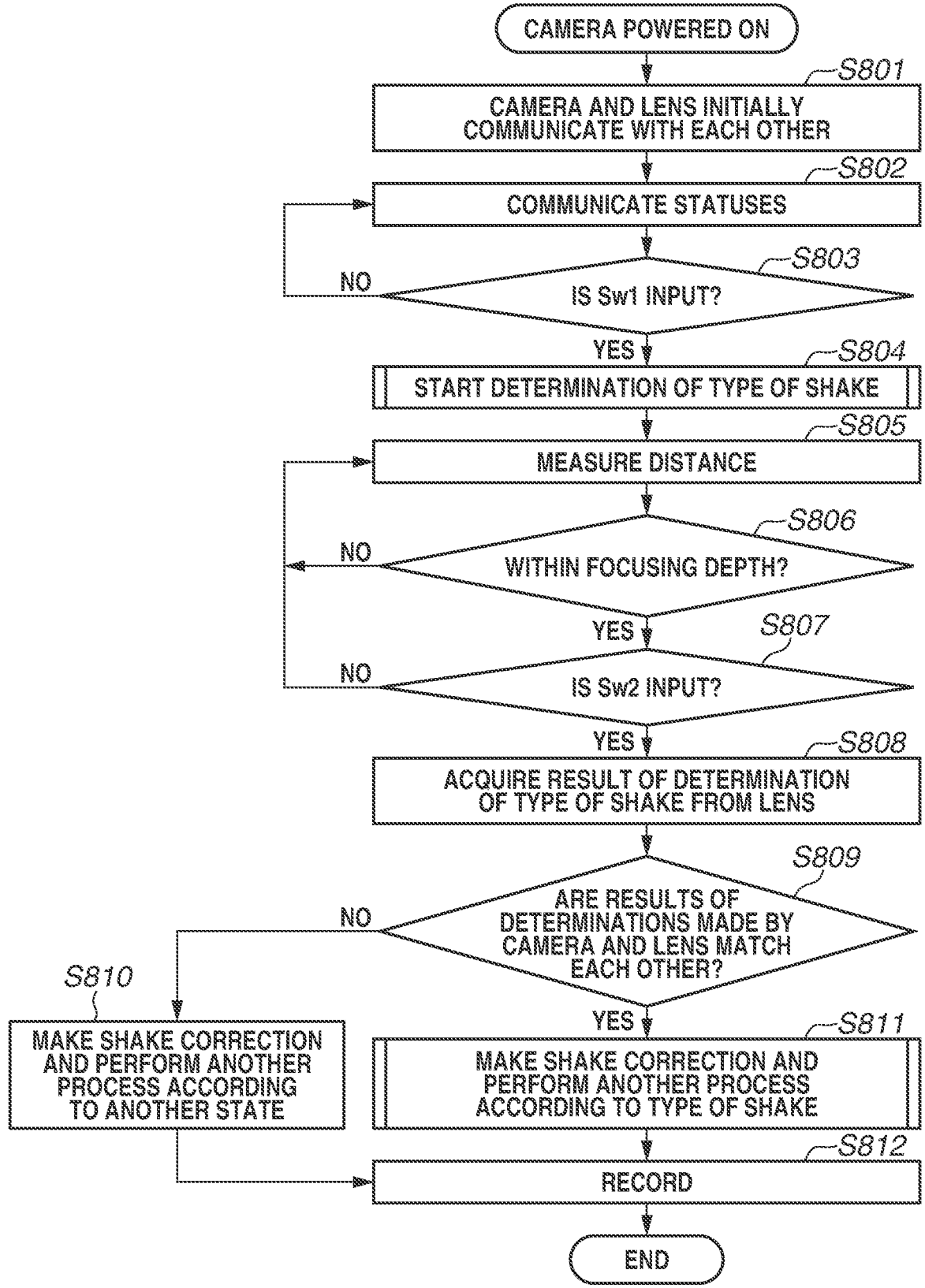
FIG. 12 is a flowchart illustrating an image capturing operation according to a fifth exemplary embodiment.

An image capturing operation according to the fifth exemplary embodiment will now be described with reference to a flowchart in FIG. 12. The processes of steps S801 to S803 in FIG. 12 are similar to those of steps S101 to S103 in FIG. 3, and therefore are not described. The processes of steps S805 to S807 in FIG. 12 are similar to those of steps S105 to S107 in FIG. 3, and therefore are not described. The processes of steps S811 and S812 in FIG. 12 are similar to those of steps S108 and S109 in FIG. 3, and therefore are not described.

In step S804, the camera calculation unit 206b starts the determination of the type of shake using the machine learning model. The camera calculation unit 206b records information regarding the determined type of the shake in the camera MPU 206. At this time, the lens calculation unit 101b also starts the determination of the type of shake by a method similar to that of the camera calculation unit 206b. The lens MPU 101 records information regarding the type of the shake determined by the lens calculation unit 101b. The camera calculation unit 206b and the lens calculation unit 101b continuously determine the types of the shake using the machine learning model up to step S811.

In step S808, the camera MPU 206 acquires the result of the determination of the type of the shake from the lens MPU 101.

In step S809, the camera MPU 206 compares the result of the determination of the type of the shake made by the camera calculation unit 206b and the result of the determination of the type of the shake made by the lens calculation unit 101b.

If the results of the determinations of the types of the shake do not match each other (NO in step S809), the processing proceeds to step S810. If, in contrast, the results of the determinations of the types of the shake match each other (YES in step S809), the processing proceeds to step S811.

In step S810, the camera image stabilizing control unit 211 makes an image stabilization based on another state. It is thus possible to prevent an image stabilization from being made according to the result of the determination of the type of shake with low reliability. It is also possible to reduce the deterioration of the accuracy of an image stabilization based on the result of an erroneous determination of the type of shake.

As described above, it is possible to make an image stabilization according to the type of shake based on the reliability of the result of the determination of the type of the shake, according to the image capturing operation described in the fifth exemplary embodiment of the disclosure.

In the present exemplary embodiment, the imaging apparatus 200 makes an image stabilization. In the present exemplary embodiment, however, the lens apparatus 100 may make an image stabilization. In such a case, the lens apparatus 100 uses the lens image stabilizing control unit 110, instead of the camera image stabilizing control unit 211 that controls an image stabilization.

The lens apparatus 100 uses the image stabilizing lens 106, instead of the image sensor 201 as a driving target member that corrects shake by moving in the direction of the optical axis of the imaging optical system. The lens apparatus 100 uses the image stabilizing lens driving motor 108 that drives the image stabilizing lens 106, instead of the image sensor driving motor 210 that drives the image sensor 201. The lens apparatus 100 uses the image stabilizing lens encoder 105 that outputs a position signal of the image stabilizing lens 106, instead of the image sensor encoder 212 that outputs a position signal of the image sensor 201.

In the present exemplary embodiment, the camera calculation unit 206b may stop the determination of the type of shake after an image capturing instruction is given similarly to the third exemplary embodiment. At this time, the lens calculation unit 101b may also stop the determination of the type of shake.

In the present exemplary embodiment, an image stabilization may be made using both the camera image stabilizing control unit 211 and the lens image stabilizing control unit 110 similarly to the fourth exemplary embodiment.

In the present exemplary embodiment, the camera MPU 206 compares the results of the determinations of the types of shake made by the camera calculation unit 206b and the lens calculation unit 101b. Instead of the camera MPU 206, however, the lens MPU 101 may compare the results of the determinations made by the camera calculation unit 206b and the lens calculation unit 101b. In such a case, the camera MPU 206 transmits the result of the determination of the type of the shake to the lens MPU 101 in step S808.

A smartphone according to a sixth exemplary embodiment will now be described.

Figure 13A:
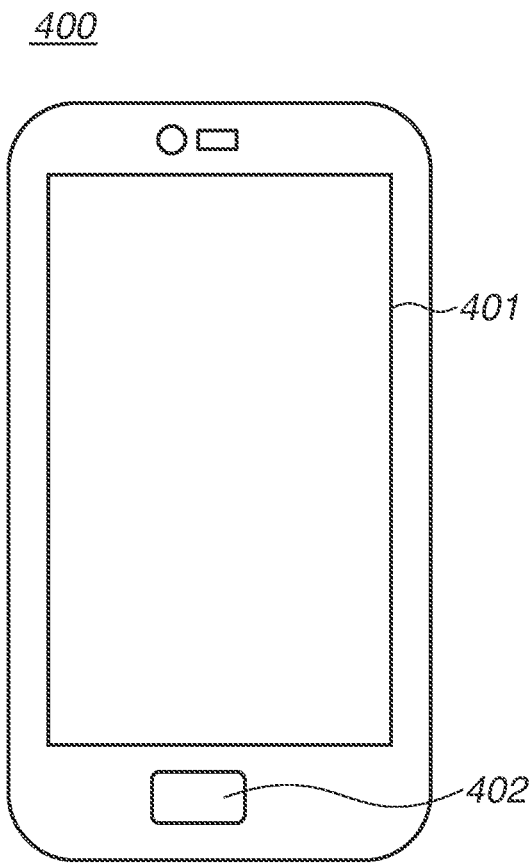
FIGS. 13A and 13B are diagrams illustrating a smartphone.
Figure 13B:
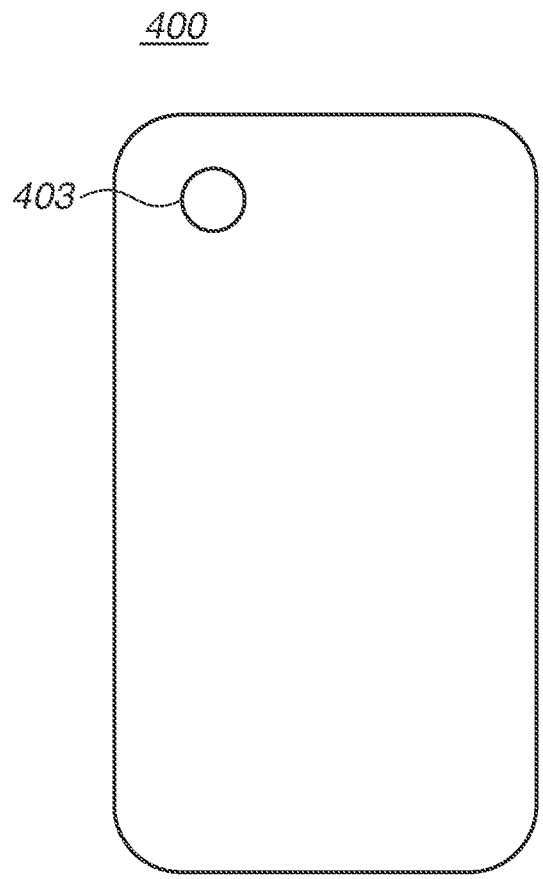

The smartphone according to the sixth exemplary embodiment is different from the imaging apparatus 200 according to the first exemplary embodiment in that the smartphone according to the sixth exemplary embodiment has an image capturing function, but does not include a shutter release button. FIGS. 13A and 13B are diagrams illustrating a smartphone 400. FIG. 13A illustrates the front side of the smartphone 400. FIG. 13B illustrates the back side of the smartphone 400. The smartphone 400 does not include a shutter release button as in the operation unit 205 illustrated in FIG. 1. Thus, the sixth exemplary embodiment is different from the first exemplary embodiment in processing resulting from shutter release signals Sw1 and Sw2 generated by the operation unit 205.

The smartphone 400 includes a display unit 401, an operation unit 402, and an image capturing unit 403.

The display unit 401 is composed of a liquid crystal panel and includes a touch sensor. That is, the user can operate the smartphone 400 by also touching the display unit 401 in addition to the operation unit 402.

The image capturing unit 403 is used to capture an object.

Figure 14:
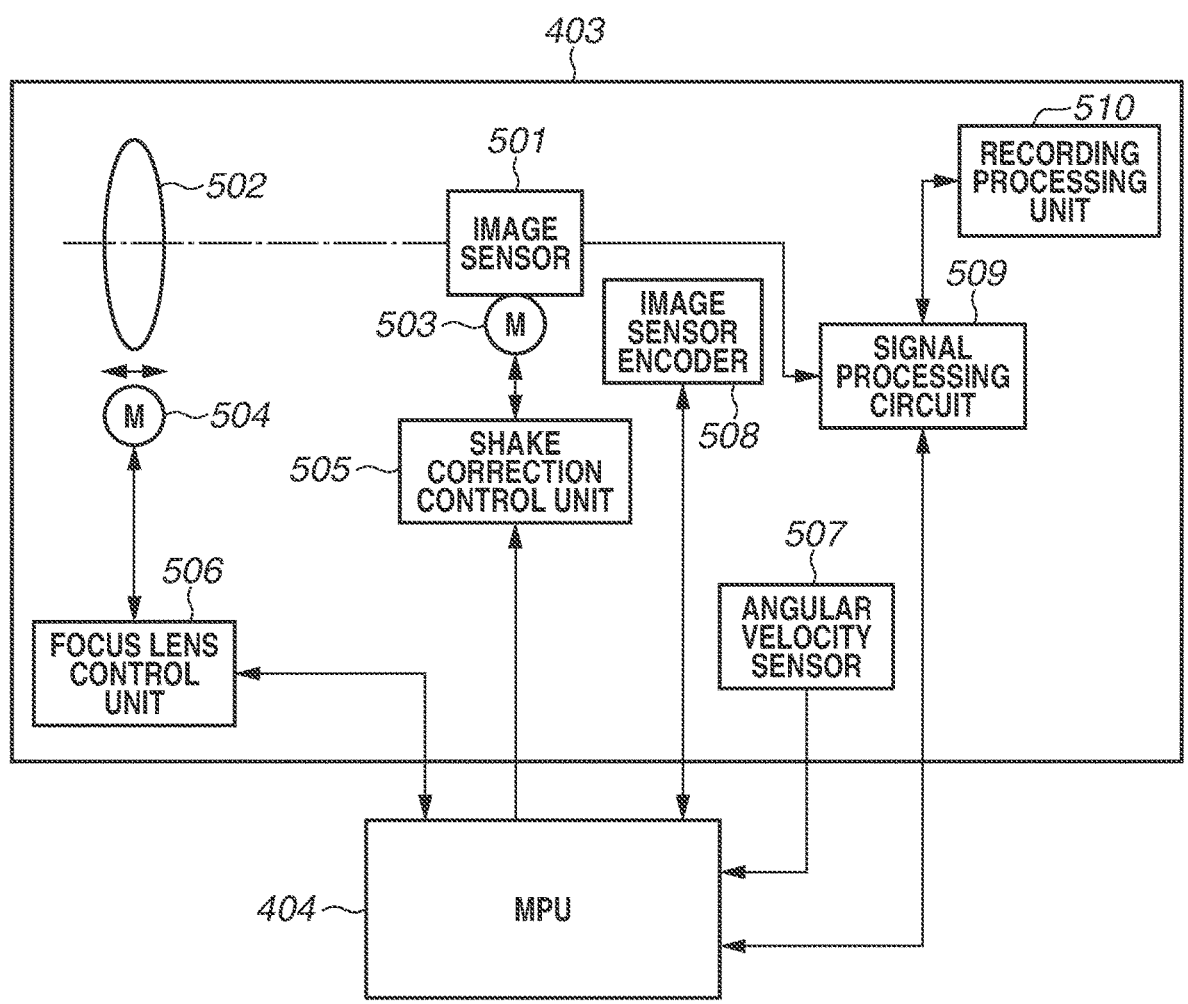
FIG. 14 is a block diagram illustrating an image capturing unit and an MPU included in the smartphone.

FIG. 14 is a block diagram illustrating the image capturing unit 403 and an MPU 404.

The image capturing unit 403 includes an image sensor 501, a focus lens 502, an image sensor driving motor 503, a focus lens driving motor 504, an image stabilizing control unit 505, and a focus lens control unit 506. The image capturing unit 403 also includes an angular velocity sensor 507, an image sensor encoder 508, a signal processing circuit 509, and a recording processing unit 510.

The MPU 404 controls the smartphone 400 based on an input provided through the display unit 401 and the operation unit 402.

Figure 15:
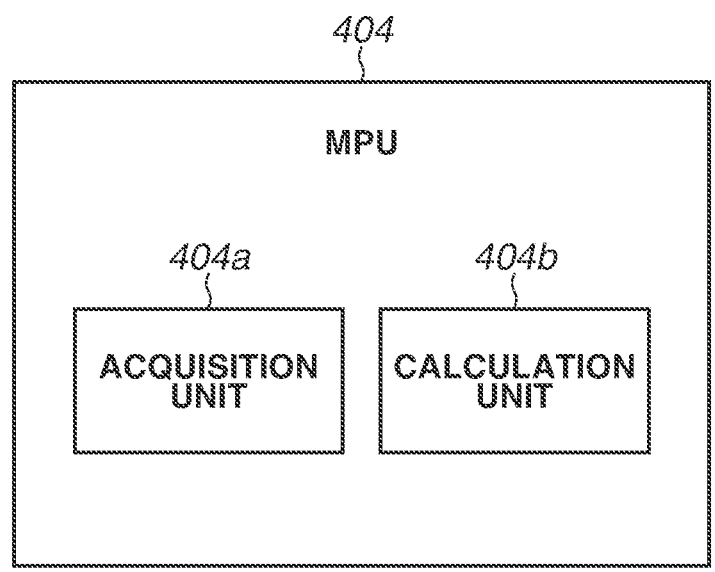
FIG. 15 is a block diagram illustrating functions of the MPU included in the smartphone.

FIG. 15 is a block diagram illustrating the functions of the MPU 404. The determination of the type of shake by the smartphone 400 according to the present exemplary embodiment is made using the functions illustrated in FIG. 15.

The MPU 404 includes an acquisition unit 404a and a calculation unit 404b. The acquisition unit 404a has a function similar to that of the camera acquisition unit 206a. The calculation unit 404b has a function similar to that of the camera calculation unit 206b.

Figure 16:
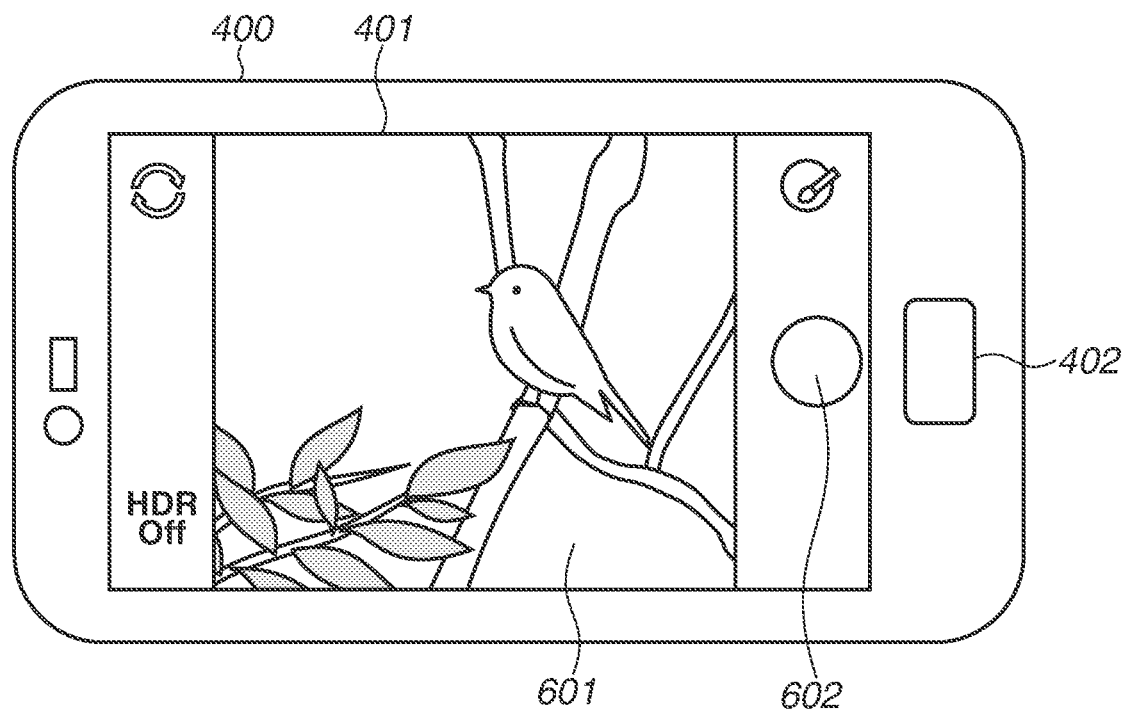
FIG. 16 is a diagram illustrating a display unit when an image capturing application for the smartphone starts.

FIG. 16 illustrates a state of the display unit 401 when an image capturing application starts in the smartphone 400.

On the display unit 401 of the smartphone 400 when the image capturing application starts, a first area 601 that displays an image of an object and a second area 602 that is a virtual button for accepting an image capturing instruction are displayed.

In the present exemplary embodiment, the result of the determination of the type of shake made by the calculation unit 404b is used for an image stabilization after the image capturing instruction is given, before an image capturing instruction is given by operating the second area 602 in the capturing of a still image. It is thus possible to determine the type of shake with high accuracy using a machine learning model and also reduce delay in processing from when an image capturing instruction is given to when an image is captured, similarly to the first exemplary embodiment, even in capturing of a still image.

The sixth exemplary embodiment of the disclosure will now be described with reference to the flowchart illustrated in FIG. 17. The flowchart in FIG. 17 starts when the image capturing application for the smartphone 400 starts.

In step S901, the calculation unit 404b starts the determination of the type of shake using the machine learning model. As input data for the machine learning model, a feature amount of a preprocessed shake detection signal acquired by the acquisition unit 404a is used. The calculation unit 404b records information regarding the determined type of the shake in the MPU 404. The calculation unit 404b continuously determines the type of the shake using machine learning up to step S906.

In step S902, the MPU 404 measures a distance for focusing on an object and calculates the driving amount of the focus lens 502.

In step S903, the MPU 404 measures the distance again. If it is determined that the distance is within a focusing depth (YES in step S903), the processing proceeds to step S904. If the distance is outside the focusing depth (NO in step S903), the processing returns to step S902 within a predetermined time or within a predetermined number of times.

In step S904, the MPU 404 determines whether an image capturing instruction is given by the user performing the operation of touching the second area 602. If the image capturing instruction is given (YES in step S904), the processing proceeds to step S905. If the image capturing instruction is not given (NO in step S904), the processing returns to step S902.

In step S905, the image stabilizing control unit 505 makes an image stabilization. The image stabilization is made based on the result of the determination of the type of the shake made by the calculation unit 404b before the image capturing instruction is given by the user performing the operation of touching the second area 602. Thus, it is possible to shorten the time from when the image capturing instruction is given to when the image stabilization is started by the image stabilizing control unit 505.

In step S906, the signal processing circuit 509 reads a signal from the image sensor 501 and saves a captured mage in the recording processing unit 510.

As described above, it is possible to determine the type of shake with high accuracy using a machine learning model and reduce delay when a still image is captured, according to the image capturing operation in the smartphone described in the sixth exemplary embodiment of the disclosure.

In the present exemplary embodiment, the image stabilization of the smartphone 400 is made by driving the image sensor 501. However, the image stabilization of the smartphone 400 may be made by driving the image stabilizing lens if the image capturing unit 403 includes an image stabilizing lens. As the image stabilization of the smartphone 400, an electronic image stabilization may be made.

In the present exemplary embodiment, the calculation unit 404b may stop the determination of the type of shake after an image capturing instruction is given to the MPU 404, similarly to the third exemplary embodiment.

The disclosure can also be achieved by the process of supplying a program for achieving one or more functions of the above exemplary embodiments to a system or an apparatus via a network or a storage medium, and of causing one or more processors of a computer of the system or the apparatus to read and execute the program. The disclosure can also be achieved by a circuit (e.g., an application-specific integrated circuit (ASIC)) for achieving the one or more functions.

While exemplary embodiments of the disclosure have been described above, the disclosure is not limited to these exemplary embodiments, and can be modified and changed in various ways within the scope of the disclosure.

According to the aspect of embodiments, it is possible to provide an electronic device that performs a determination process for determining an image capturing state with high accuracy.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-043283, filed Mar. 17, 2021, which is hereby incorporated by reference herein in its entirety.

What is claimed is:

1. A device comprising:
   at least one processor; and
   a memory storing instructions that cause the at least one processor to function as:
   an acquisition unit configured to acquire first information regarding shake;
   a calculation unit configured to input the first information to a machine learning model and output second information regarding a type of the shake;
   a first control unit configured to control an image stabilization using the second information,
   wherein by using the second information based on the first information before a capturing instruction is given, the first control unit controls an image stabilization after the capturing instruction is given;
   wherein the type of the shake is selected from at least two states of a walking state, a tripod state, a panning state, and a hold state; and
   wherein the first control unit controls the image stabilization differently for each of the at least two states,
   wherein the calculation unit outputs the second information based on the first information that is time series data having the first length, and the second information based on the first information that is time series data having the second length longer than the first length.

2. The device according to claim 1, wherein the calculation unit stops processing using the machine learning model according to the capturing instruction.

3. The device according to claim 1, wherein the first information is time series data having a length greater than or equal to 0.1 seconds and smaller than or equal to 5.0 seconds.

4. The device according to claim 1, wherein the first information is time series data having a length greater than or equal to 0.1 seconds and smaller than or equal to 0.4 seconds.

5. The device according to claim 1, wherein the first control unit controls an image stabilization using at least one of the second information based on the first information having the first length and the second information based on the first information having the second length.

6. The device according to claim 5, wherein before the second information based on the first information having the second length is output from the calculation unit, the first control unit controls an image stabilization using the second information based on the first information having the first length.

7. The device according to claim 1, further comprising at least one velocity sensor configured to output a velocity signal and an acceleration sensor configured to output an acceleration signal,
wherein the first information is data based on a detection signal regarding at least one of the velocity signal and the acceleration signal.

8. The device according to claim 7, wherein the first information is data based on the detection signal subjected to at least one of a standardization process, a missing value removal process, an outlier removal process, and a unit conversion process.

9. The device according to claim 7, wherein the first information includes at least one of an average value, a maximum value, a minimum value, a root sum, a variance, a standard deviation, a kurtosis, and a skewness of the shake detection signal.

10. The device according to claim 7, wherein the first control unit uses the detection signal and an image stabilizing signal based on the second information for an image stabilization.

11. The device according to claim 1, further comprising an image sensor,
wherein the first control unit controls an image stabilization by driving the image sensor.

12. The device according to claim 1, further comprising an image stabilizing lens,
wherein the first control unit controls an image stabilization by driving the image stabilizing lens.

13. The device according to claim 1,
wherein the device communicates with another device including a second control unit configured to control an image stabilization, and
wherein the first control unit acquires a correction ratio between an image stabilization to be made by the first control unit and an image stabilization to be made by the second control unit and controls an image stabilization using the correction ratio and the second information.

14. The device according to claim 1,
wherein the device acquires third information regarding a type of shake from another device configured to communicate with the device, and
wherein the first control unit controls an image stabilization using information based on the second information and the third information.

15. The device according to claim 14, wherein in a case where the second information and the third information match each other, the first control unit controls an image stabilization using the second information.

16. A device configured to communicate with another device, the device comprising:
an acquisition unit configured to acquire first information regarding shake that occurs in at least one of the device and the another device;
a calculation unit configured to input the first information to a machine learning model and output second information; and
a communication unit configured to transmit to the another device the second information corresponding to the first information before a capturing instruction is given;
wherein the another device is configured to, using the second information transmitted from the communication unit, control an image stabilization after the capturing instruction is given;
wherein the second information is information on a type of the shake selected from at least two states of a walking state, a tripod state, a panning state, and a hold state;
wherein the another device controls the image stabilization differently for each of the at least two states, and
wherein the calculation unit outputs the second information based on the first information that is time series data having the first length, and the second information based on the first information that is time series data having the second length longer than the first length.

17. A method comprising:
acquiring first information regarding shake;
inputting the first information to a machine learning model and outputting second information regarding a type of the shake; and
controlling an image stabilization using the second information,
wherein in the controlling, by using the second information based on the first information before a capturing instruction is given, an image stabilization after the capturing instruction is given is controlled;
wherein the type of the shake is selected from at least two states of a walking state, a tripod state, a panning state, and a hold state;
wherein in the controlling, the image stabilization differently for each of the at least two states, and
wherein outputting the second information is based on the first information that is time series data having the first length, and the second information based on the first information that is time series data having the second length longer than the first length.

18. A non-transitory computer-readable storage medium that stores a program for causing a computer to execute the method according to claim 17.

19. A device comprising:
at least one processor; and
a memory storing instructions that cause the at least one processor to function as:
an acquisition unit configured to acquire first information regarding shake;
a calculation unit configured to input the first information to a machine learning model and output second information regarding a type of the shake;
a first control unit configured to control an image stabilization using the second information,
wherein by using the second information based on the first information before a capturing instruction is given, the first control unit controls an image stabilization after the capturing instruction is given;
wherein the calculation unit outputs the second information based on the first information that is time series data having a first length, and the second information based on the first information that is time series data having a second length longer than the first length.

\* \* \* \* \*